US012457446B2

(12) United States Patent
 Radivojevic (10) Patent No.: US 12,457,446 B2
(45) Date of Patent: Oct. 28, 2025

(54) EYEWEAR DEVICE

(71) Applicant: Nokia Technologies Oy, Espoo (FI)

(72) Inventor: Zoran Radivojevic, Cambridge (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 231 days.

(21) Appl. No.: 18/328,072

(22) Filed: Jun. 2, 2023

(65) Prior Publication Data

US 2023/0412974 A1 Dec. 21, 2023

(30) Foreign Application Priority Data

Jun. 17, 2022 (GB) .................................... 2208955

(51) Int. Cl.
 *H04R 1/34* (2006.01)
 *G06F 3/16* (2006.01)
 *G10L 25/78* (2013.01)
 *H04R 1/02* (2006.01)
 *H04R 1/08* (2006.01)

(52) U.S. Cl.
 CPC ............. *H04R 1/342* (2013.01); *G06F 3/167* (2013.01); *G10L 25/78* (2013.01); *H04R 1/028* (2013.01); *H04R 1/08* (2013.01)

(58) Field of Classification Search
 CPC .......... H04R 1/342; H04R 1/08; H04R 1/028; G06F 3/167; G10L 25/78
 See application file for complete search history.

(56) References Cited

U.S. PATENT DOCUMENTS

| | | |
|---|---|---|
| 9,503,800 B2 | 11/2016 | Song et al. |
| 10,473,956 B2 | 11/2019 | Mou et al. |
| 10,674,257 B1 | 6/2020 | Zhong et al. |
| 10,701,480 B1 | 6/2020 | Yang et al. |
| 10,911,720 B2 | 2/2021 | Antunes et al. |
| 11,246,530 B2 | 2/2022 | Moyerman et al. |
| 11,275,482 B2 | 3/2022 | Osterhout et al. |

(Continued)

FOREIGN PATENT DOCUMENTS

EP 3062144 A1 8/2016

OTHER PUBLICATIONS

"These New Contact Lenses Let You Zoom In with Just a Wink", MIC, Retrieved on Apr. 6, 2023, Webpage available at : https://www.mic.com/articles/113148/for-some-glasses-wearers-nbsp-telescopic-contact-lenses-could-change-your-life.

(Continued)

*Primary Examiner* — Jason R Kurr
(74) *Attorney, Agent, or Firm* — SQUIRE PATTON BOGGS (US) LLP (57) ABSTRACT

An eyewear device and a method performed at an eyewear device is described, the eyewear device comprising: a frame comprising one or more elements configured, in use, to be in physical contact with at least one body part of a user or wearer of the eyewear device; one or more arms; and one or more microphones, wherein the one or more microphones are configured to detect pressure waves generated at the one or more elements. The method comprises: receiving one or more signals indicative of internal body sounds from the one or more microphones, wherein the one or more microphones are configured to detect pressure waves transmitted by the one or more elements; and processing said signals.

18 Claims, 6 Drawing Sheets

(56) References Cited

U.S. PATENT DOCUMENTS

2021/0014614 A1\* 1/2021 Donley ............... H04S 1/005
2021/0165249 A1 6/2021 Wang et al.

OTHER PUBLICATIONS

United Kingdom Application No. 2207027.0, "Eyewear Device", filed on May 13, 2022, pp. 1-19.
"9 Classy Smart Glasses to Adopt a Futuristic Lifestyle", Interesting Engineering, Retrieved on Apr. 6, 2023, Webpage available at : https://interestingengineering.com/deals/9-classy-smart-glasses-to-adopt-a-futuristic-lifestyle.
Lopez et al., "High-Performance Analog Front-End (AFE) for EOG Systems", Electronics, vol. 9, No. 6, 2020, pp. 1-15.
"CORE Digital Stethoscope", 3M United Kingdom, Retrieved on Apr. 6, 2023, Webpage available at : https://www.3m.co.uk/3M/en_GB/Littmann-UK/advantages/core-digital-stethoscope/.
Search Report received for corresponding United Kingdom Patent Application No. 2208955.1, dated Dec. 14, 6 2022, 7 pages.
Extended European Search Report received for corresponding European Patent Application No. 23177197.3, dated Nov. 1, 15, 2023, 9 pages.

\* cited by examiner

EYEWEAR DEVICE

RELATED APPLICATION

This application claims priority to the United Kingdom patent application number 2208955.1, filed on Jun. 17, 2022, the content of which is incorporated herein by reference in its entirety.

FIELD

The present specification relates to an eyewear device, such as glasses or smart-glasses.

BACKGROUND

Use of microphones in smart-glasses are known. There remains a need for improvement in sensing sound waves in eyewear devices.

SUMMARY

In a first aspect, this specification provides an eyewear device comprising: a frame comprising one or more elements configured, in use, to be in physical contact with at least one body part of a user or wearer of the eyewear device; one or more arms; and one or more microphones, wherein the one or more microphones are configured to detect pressure waves generated at the one or more elements. The eyewear device may, for example, be glasses, smart-glasses, virtual reality, mixed reality or augmented reality glasses, a headset, head-mounted display, or the like.

In some examples, the eyewear device further comprises at least one channel, each channel provided between at least one of the one or more microphones and at least one of the one or more elements, wherein each channel is configured to transfer respective pressure waves from the respective one or more elements to the respective one or more microphones.

In some examples, each channel is a substantially air-tight channel.

In some examples, each channel is provided, at least in part, in one or more of said arms of the eyewear device.

In some examples, the one or more microphones are provided in one or more of said arms. The eyewear device may comprise one or more hinges enabling said arms to be moved between a folded position and unfolded position, wherein the one or more hinges connect channels within the eyewear device. In some examples, said connected channels are substantially air-tight when said arms are in the unfolded position.

In some examples, the one or more microphones are provided at said frame. The eyewear device may comprise one or more hinges enabling said one or more arms to be moved between a folded position and unfolded position, wherein the one or more hinges comprise one or more electric contacts for connecting the one or more microphones to one or more electronic modules of the eyewear device respectively.

In some examples, the one or more elements are conical. In some examples, the one or more elements comprise soft elastomer material (e.g. silicone, polyurethane, or the like).

In some examples, the at least one body part of the user or wearer of the eyewear device comprises the user's or wearer's nasal area.

In some examples, the eyewear device is configured to detect internal body sounds such as one or more of: one or more eyeball movements, eye winking, speech, whispered speech, respiration, heartbeat, chewing movements, sneezes, or coughs.

In a second aspect, this specification provides a method performed at an eyewear device as described with respect to the first aspect, comprising: receiving one or more signals indicative of internal body sounds from the one or more microphones, wherein the one or more microphones are configured to detect pressure waves transmitted by the one or more elements; and processing said signals.

In some examples, processing said signals comprises detecting and/or analysing movements and/or speech of the user or wearer.

In some examples, processing said signals comprises combining the one or more signals with one or more speech signals from the one or more microphones to detect speech of the user or wearer.

In some examples, processing said signals comprises providing an output indicative of a user instruction for a user interface.

In a third aspect, this specification provides an apparatus comprising means for performing: receiving one or more signals indicative of internal body sounds from the one or more microphones, wherein the one or more microphones are configured to detect pressure waves transmitted by the one or more elements; and processing said signals.

In some examples, processing said signals comprises detecting and/or analysing movements and/or speech of the user or wearer.

In some examples, processing said signals comprises combining the one or more signals with one or more speech signals from the one or more microphones to detect speech of the user or wearer.

In some examples, processing said signals comprises providing an output indicative of a user instruction for a user interface.

The means may comprise: at least one processor; and at least one memory including computer program code, the at least one memory and the computer program code configured, with the at least one processor, to cause the performance of the apparatus.

In a fourth aspect, this specification describes an apparatus configured to perform any method as described with reference to the second aspect.

In a fifth aspect, this specification describes computer-readable instructions which, when executed by computing apparatus, cause the computing apparatus to perform any method as described with reference to the second aspect.

In a sixth aspect, this specification describes a computer program comprising instructions for causing a processor of an eyewear device as described with reference to the first aspect, to perform at least the following: receiving one or more signals indicative of internal body sounds from the one or more microphones, wherein the one or more microphones are configured to detect pressure waves transmitted by the one or more elements; and processing said signals.

In some examples, processing said signals comprises detecting and/or analysing movements and/or speech of the user or wearer. In some examples, processing said signals comprises combining the one or more signals with one or more speech signals from the one or more microphones to detect speech of the user or wearer. In some examples, processing said signals comprises providing an output indicative of a user instruction for a user interface.

In a seventh aspect, this specification describes a computer-readable medium (such as a non-transitory computer-readable medium) comprising program instructions stored thereon for performing at least the following: receiving one or more signals indicative of internal body sounds from the one or more microphones, wherein the one or more microphones are configured to detect pressure waves transmitted by the one or more elements; and processing said signals.

In some examples, processing said signals comprises detecting and/or analysing movements and/or speech of the user or wearer. In some examples, processing said signals comprises combining the one or more signals with one or more speech signals from the one or more microphones to detect speech of the user or wearer. In some examples, processing said signals comprises providing an output indicative of a user instruction for a user interface.

In an eighth aspect, this specification describes an apparatus comprising: at least one processor; and at least one memory including computer program code which, when executed by the at least one processor, causes the apparatus to: receive one or more signals indicative of internal body sounds from the one or more microphones, wherein the one or more microphones are configured to detect pressure waves transmitted by the one or more elements; and process said signals.

In some examples, processing said signals comprises detecting and/or analysing movements and/or speech of the user or wearer. In some examples, processing said signals comprises combining the one or more signals with one or more speech signals from the one or more microphones to detect speech of the user or wearer. In some examples, processing said signals comprises providing an output indicative of a user instruction for a user interface.

In a ninth aspect, this specification describes an apparatus comprising: a first module configured to receive one or more signals indicative of internal body sounds from the one or more microphones, wherein the one or more microphones are configured to detect pressure waves transmitted by the one or more elements; and a second module configured to process said signals.

In some examples, processing said signals comprises detecting and/or analysing movements and/or speech of the user or wearer. In some examples, processing said signals comprises combining the one or more signals with one or more speech signals from the one or more microphones to detect speech of the user or wearer. In some examples, processing said signals comprises providing an output indicative of a user instruction for a user interface.

BRIEF DESCRIPTION OF THE DRAWINGS

Example embodiments will now be described, by way of example only, with reference to the following schematic drawings, in which.

DETAILED DESCRIPTION

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Figure 1:
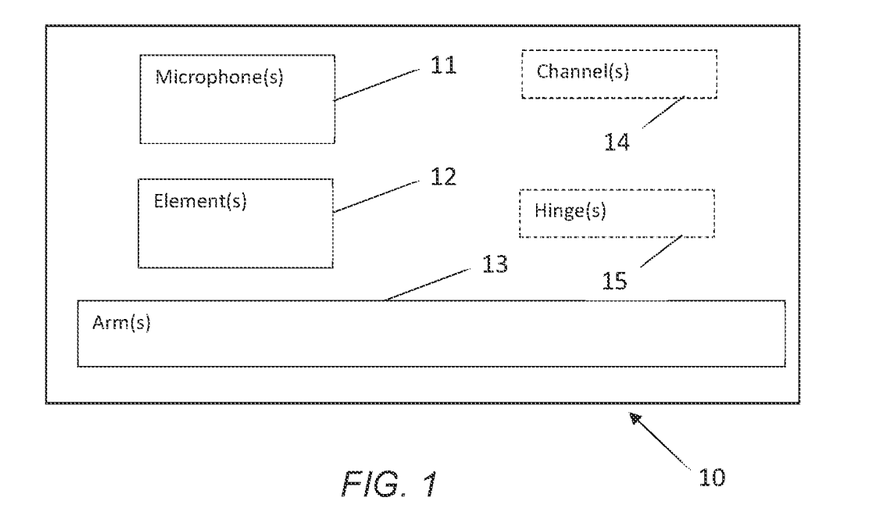
FIG. 1 is a block diagram of a system in accordance with an example embodiment.

FIG. 1 is a block diagram of an eyewear device, indicated generally by the reference numeral 10, in accordance with an example embodiment. The eyewear device 10 may, for example, be glasses, smart-glasses, virtual reality glasses, mixed reality or augmented reality glasses, a headset, head-mounted display, or the like. The eyewear device 10 comprises one or more microphones 11, one or more elements 12, and one or more arms 13.

The one or more elements 12 may be comprised within a frame of the eyewear device 10. When the eyewear device 10 is in use (e.g. worn by a user or wearer), the one or more elements 12 are configured to be in physical contact with at least one body part of the user or wearer of the eyewear device 10. For example, the one or more elements 12 may be placed on a part of the frame that may be in physical contact with a nasal area of the user or wearer of the eyewear device 10. In one example, for the purposes of this description, a frame of the eyewear device 10 comprises part of the eyewear device 10 that is in front of the eyes of the user or wearer, and excludes the arms 13 of the eyewear device 10.

The one or more microphones 11 are configured to detect pressure waves generated at the one or more elements 12. In one example, the elements 12 may comprise pads or membranes that may allow detection of vibrations, for example, from internal body sounds when said elements 12 are in physical contact with at least one body part of the user. In one example, the elements 12 comprise pads or membranes made of soft elastomer material, such as silicone, polyurethane, or the like. In one example, the elements 12 may be similar to miniature stethoscope membranes.

In an example embodiment, the eyewear device 10 may further comprise at least one channel 14. Each channel 14 may be provided between at least one of the one or more microphones 11 and at least one of the one or more elements 12. Each channel 14 may be configured to transfer respective pressure waves from the respective one or more elements 12 to the respective one or more microphones 11, thus, for example, enabling the one or more microphones 11 to detect said pressure waves.

In an example embodiment, the eyewear device 10 may further comprise one or more hinges 15 enabling the respective one or more arms 13 to be moved between a folded position and an unfolded position. In one example, the one or more hinges 15 may connect channels 14 within the eyewear device 10.

Example configurations of the eyewear device 10 are described in further detail below with reference to FIGS. 2 to 6.

Figure 2:
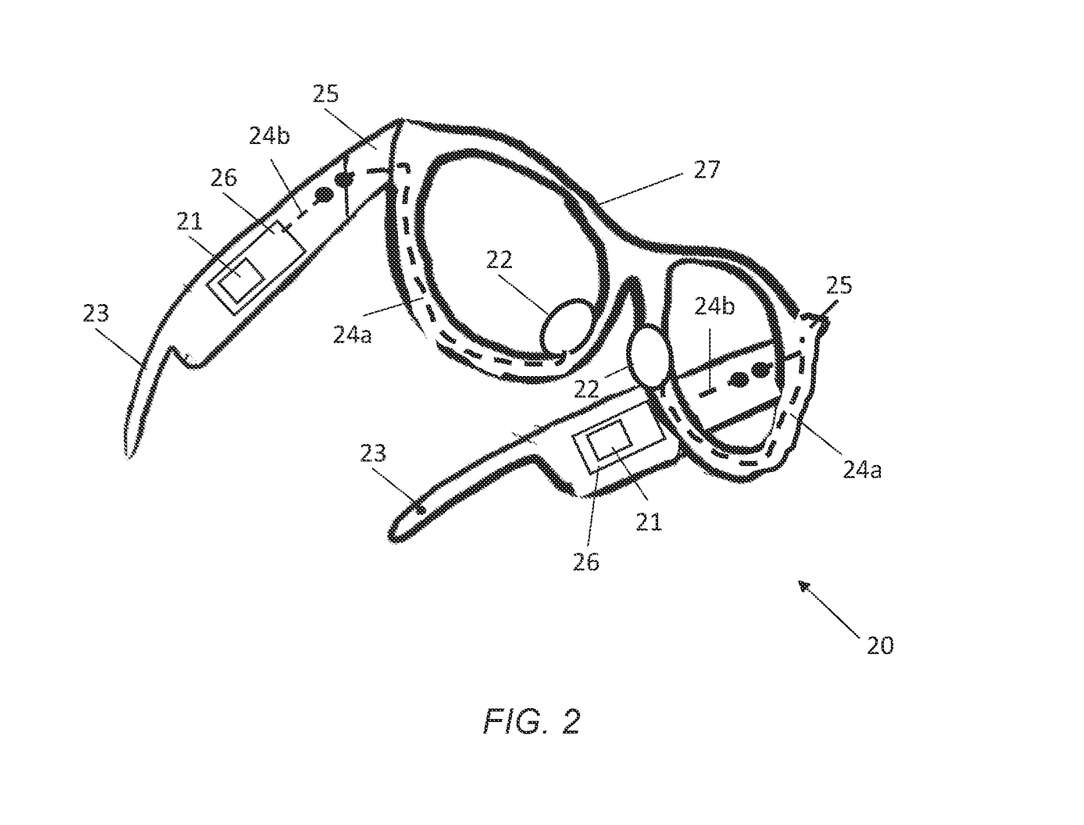
FIGS. 2 to 6 are illustrations of eyewear devices in accordance with example embodiments.

FIG. 2 is an illustration of an eyewear device, indicated generally by the reference numeral 20, in accordance with an example embodiment. The eyewear device 20 comprises arms 23 and a frame 27, which frame 27 comprises elements 22 (similar to the elements 12 described above). The elements 22 may be placed on the frame 27 such that, in use, the elements 22 are in physical contact with at least one body part (e.g. the nasal area) of a user or wearer of the eyewear device 20.

In one example, the elements 22 may generate pressure waves based on internal body sounds due to being in physical contact with at least one body part of the user or wearer. For example, the elements 22 may be in contact with the nasal area of the user or wearer, thus generating pressure waves (e.g. vibrations) derived from internal body sounds, for example, due to being in contact with bone(s) and/or flesh of the user. Internal body sounds may comprise sounds and/or movements caused by one or more of eyeball movements, eye winking, speech, whispered speech, respiration, heartbeat, chewing movements, sneezes, and/or coughs. Such internal body sounds may cause vibrations to travel through bone(s) and/or flesh of the user towards the one or more elements 22. For example, as there may be minimal or no air gap between the elements 22 and at least part of the body of the user, the noise within the vibrations may be minimal (e.g. there may be minimal loss in amplitude of the vibrations).

In one example, the placement of the elements 22 on the frame 27 allows at least some weight of the eyewear device 20, when in use (worn by a user or wearer) to create pressure on the elements 22, such that the elements 22 are further pressed against the nasal area of the user or wearer, thus improving the physical contact between the elements 22 and the at least one body part of the user.

The eyewear device 20 may further comprise electronic circuitry 26, for example, on one or both arms 23. The eyewear device 20 comprises one or more microphones 21 that may be comprised within the respective arms 23, for example, as part of the electronic circuitry 26. The microphones 21 on each side of the eyewear device 20 may detect pressure waves generated by the elements 22 on the respective side, and in turn detect internal body sounds. For example, the detected internal body sounds may be turned into electronic signals and processed by one or more components in the electronic circuitry 26.

The eyewear device 20 further comprises hinges 25 enabling said arms 23 to be moved between a folded position and an unfolded position.

In an example embodiment, a channel 24 (shown by a dashed line) is provided between each microphone 21 and element 22, where the channel 24 is configured to transfer respective pressure waves from the respective one or more elements 22 to the respective one or more microphones 21. For example, a channel 24a is formed between the respective element 22 and the respective hinge 25, and a channel 24b is formed between the respective microphone 21 and the respective hinge 25. The hinges 25 may therefore be configured to connect the channels 24a and 24b (e.g. when the eyewear device is in an unfolded position) in order to create a single channel 24.

In one example, the each of the channels 24a and 24b is an air-tight channel (e.g. with respect to the outside environment). Therefore, the frame may be sealed in order to allow the channels 24a and 24b to be substantially air-tight. There may be presence of air internally within the channels, such that pressure waves (e.g. acoustic pressure waves) are able to travel through the channel.

In one example, the hinge 25 is an air-tight hinge. For example, when the eyewear device 20 is in an unfolded position, and the hinge 25 connects the channels 24a and 24b to form a channel 24, the channel 24 is substantially air-tight (e.g. with respect to the outside environment, i.e. a sealed channel). For example, the hinge 25 may comprise two aligned holes with an air-tight coupling mechanism, such that when the arms 23 of the eyewear device 20 are in an unfolded position (e.g. when the eyewear device 20 is in use, being worn by a user or wearer), the hinge 25 is substantially air-tight, and connects air-tight channels 24a and 24b to form a single air-tight channel 24.

In an example embodiment, when internal body sounds cause generation of pressure waves at the elements 22, the pressure waves (e.g. acoustic pressure waves) may be transferred from the respective element 22 to the respective microphone 21 via the respective channel 24 and converted into signals (e.g. electronic signals) at the microphone 21, the respective channel 24 being air-tight. As the pressure waves are transferred in an air-tight channel, the signals generated at the microphone 21 may have a high signal-to-noise ratio (SNR) because the air-tight system allows external noise to be minimized. Furthermore, the internal body sounds detected by the microphones 21 may be faint (e.g. low amplitude), such that microphones may not be able to detect pressure waves corresponding to such internal body sounds travelling through air in an external environment without the channels 24.

Figure 3:
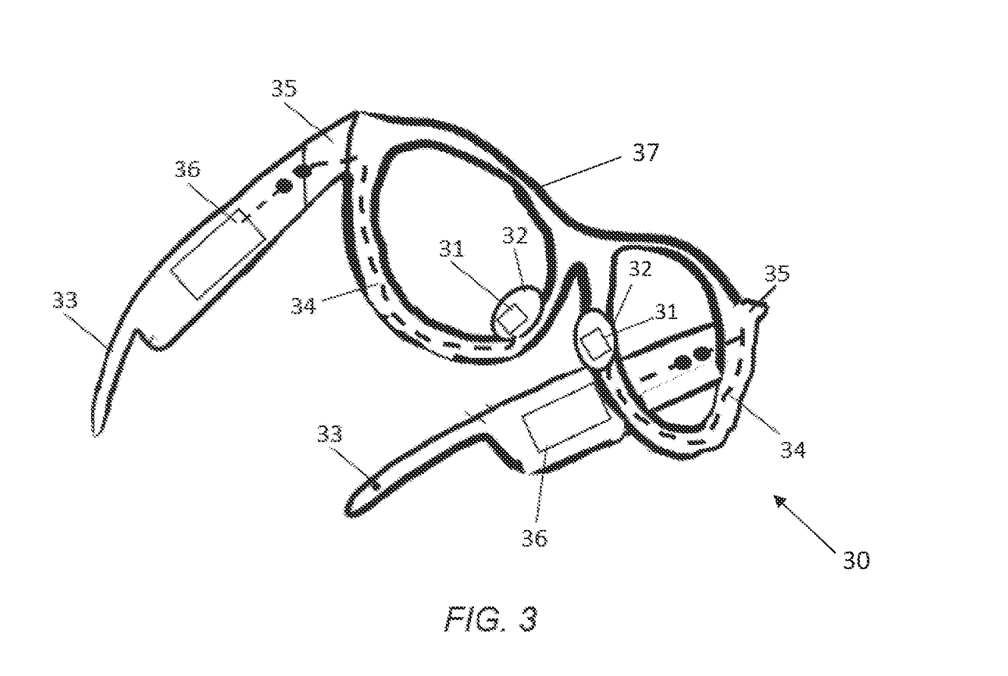

FIG. 3 is an illustration of an eyewear device, indicated generally by the reference numeral 30, in accordance with an example embodiment.

Eyewear device 30 comprises arms 33 (similar to arms 23) and a frame 37 (similar to frame 27), which frame 37 comprises elements 32 (similar to elements 12 and 22). The elements 32 may be placed on the frame 37 such that, in use, the elements 32 are in physical contact with at least one body part (e.g. the nasal area) of a user or wearer of the eyewear device 30.

The eyewear device 30 may further comprise electronic circuitry 36, for example, on one or both arms 33. The eyewear device 30 is different from the eyewear device 20 in that the eyewear device 30 comprises one or more microphones 31 that may be comprised within the frame 37 (rather than at the arms of the eyewear device). For example, the microphones 31 may be integrated with the elements 32 at the frame 37.

The microphones 31 on each side may detect pressure waves generated by the elements 32 on the respective side, and in turn detect internal body sounds. For example, the detected internal body sounds may be turned into electronic signals by the microphones 31, which electronic signals may be transmitted to and processed by one or more components in the electronic circuitry 36.

The eyewear device 30 further comprises hinges 35 enabling said arms 33 to be moved between a folded position and an unfolded position.

In an example embodiment, a channel 34 (shown by a dashed line) is provided between each microphone 31 and electronic circuitry 36, where the channel 34 is configured to transfer respective electronic signals (e.g. generated based on internal body sounds causing pressure waves to be generated at the elements 32 and detected by the microphones 31) from the microphone 31 to the electronic circuitry 36.

In one example, the channel(s) 34 comprise electric lines (e.g. copper wiring) for delivering electric signals to the electronic circuitry 36.

In one example, the hinges 35 comprise one or more electric contacts for connecting the microphone(s) 31 to one or more electronic modules of electronic circuitry 36.

In one example, the electric contacts in the hinges 35 may allow the microphones 31 to be connected to the electronic circuitry 36 when the eyewear device 30 is in an unfolded position (e.g. in use, being worn by a user or wearer), and may disconnect the microphones 31 from the electronic circuitry 36 when the eyewear device 30 is in a folded position (e.g. not in use).

Figure 4:
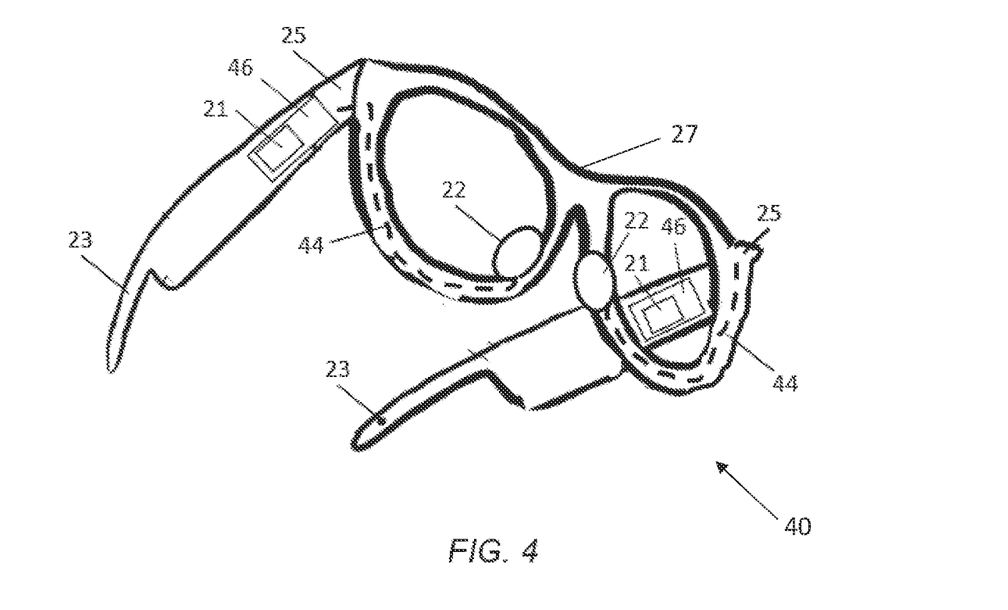

FIG. 4 is an illustration of an eyewear device, indicated generally by the reference numeral 40, in accordance with an example embodiment.

Eyewear device 40 is similar to eyewear device 20, comprising arms 23 and a frame 27, which frame 27 comprises elements 22. The eyewear device 40 comprises electronic circuitry 46 and microphones 21, for example, as part of the electronic circuitry 46. The eyewear device 40 further comprises a hinge 25 enabling said arms 23 to be moved between a folded position and unfolded position.

The eyewear device 40 is different from the eyewear device 20 in that the eyewear device 40 comprises electronic circuitry 46 at the hinge 25, the frame 27, or in a position that is relatively (in comparison with electronic circuitry 26) nearer to the frame 27. A channel 44 (shown by a dashed line) may be provided between each microphone 21 and respective element 22. The positioning of the microphone at or near the hinge 25, or frame 27, allows the channel 44 to be provided in the frame 27 (e.g. the channel 44 may not extend to the arms 23).

The channel 44 is configured to transfer respective pressure waves from the respective one or more elements 22 to the respective one or more microphones 21. The channel 44 may be an air-tight channel (e.g. with respect to the outside environment). Therefore, the frame may be sealed in order to allow the channels 44 to be substantially air-tight. There may be presence of air internally within the channel 44, such that pressure waves (e.g. acoustic pressure waves) are able to travel through the channel 44.

In one example, the hinge 25 may comprise electrical connections connecting to the electronic circuitry 46.

Alternatively, the hinge 25 may be an air-tight hinge. For example, when the eyewear device 20 is in an unfolded position, the hinge 25 may form part of the channel 44, thus allowing pressure waves to travel from element 22 to microphone 21. For example, the hinge 25 may comprise two aligned holes with an air-tight coupling mechanism, such that when the arms 23 of the eyewear device 40 are in an unfolded position (e.g. when the eyewear device 20 is in use, being worn by a user or wearer), the hinge 25 is air-tight.

Figure 5:
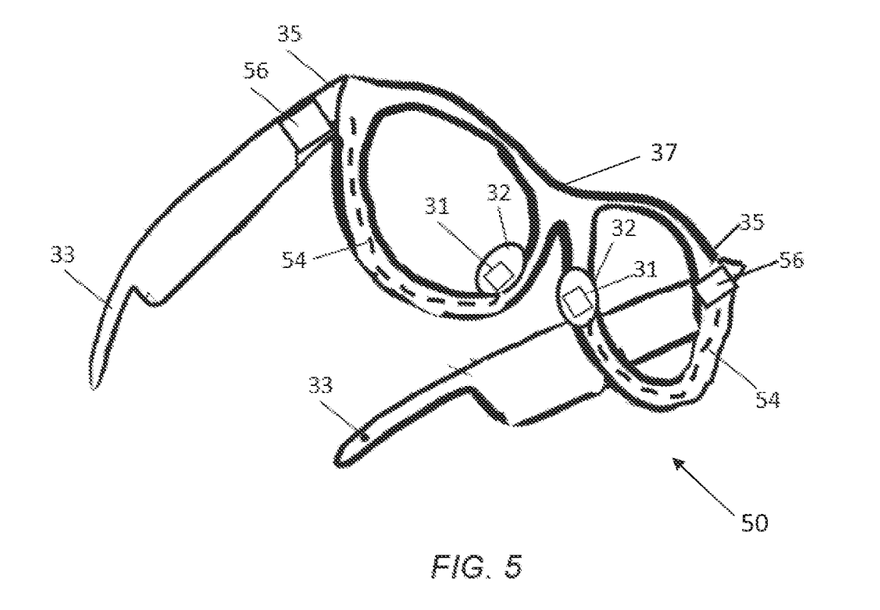

FIG. 5 is an illustration of an eyewear device, indicated generally by the reference numeral 50, in accordance with an example embodiment.

Eyewear device 50 is similar to eyewear device 30, comprising arms 33 and a frame 37, which frame 37 comprises elements 32. The eyewear device 30 comprises one or more microphones 31 that may be comprised within the frame 37. For example, the microphones 31 may be integrated with the elements 32 at the frame 37.

The eyewear device 50 may further comprise electronic circuitry 56, at the hinge 35, the frame 37, or in a position that is relatively (in comparison with electronic circuitry 36) nearer to the frame 37.

The microphones 31 on each side may detect pressure waves generated by the elements 32 on the respective side, and in turn detect internal body sounds. For example, the detected internal body sounds may be turned into electronic signals by the microphones 31, which electronic signals may be transmitted to and processed by one or more components in the electronic circuitry 56.

The eyewear device 50 further comprises hinges 35 enabling said arms 33 to be moved between a folded position and an unfolded position.

In an example embodiment, a channel 54 (shown by a dashed line) is provided between each microphone 21 and electronic circuitry 56, where the channel 54 is configured to transfer respective electronic signals (e.g. generated based on internal body sounds causing pressure waves to be generated at the elements 32 and detected by the microphones 31) from the microphone 31 to the electronic circuitry 56.

In one example, the channel(s) 54 comprise electric lines (e.g. copper wiring) for delivering electric signals to the electronic circuitry 56.

In one example, the hinges 35 comprise one or more electric contacts for connecting the microphone(s) 31 to one or more electronic modules of electronic circuitry 56.

In one example, the electric contacts in the hinges 35 may allow the microphones 31 to be connected to the electronic circuitry 56 when the eyewear device 50 is in an unfolded position (e.g. in use, being worn by a user or wearer), and may disconnect the microphones 31 from the electronic circuitry 56 when the eyewear device 30 is in a folded position (e.g. not in use).

Figure 6:
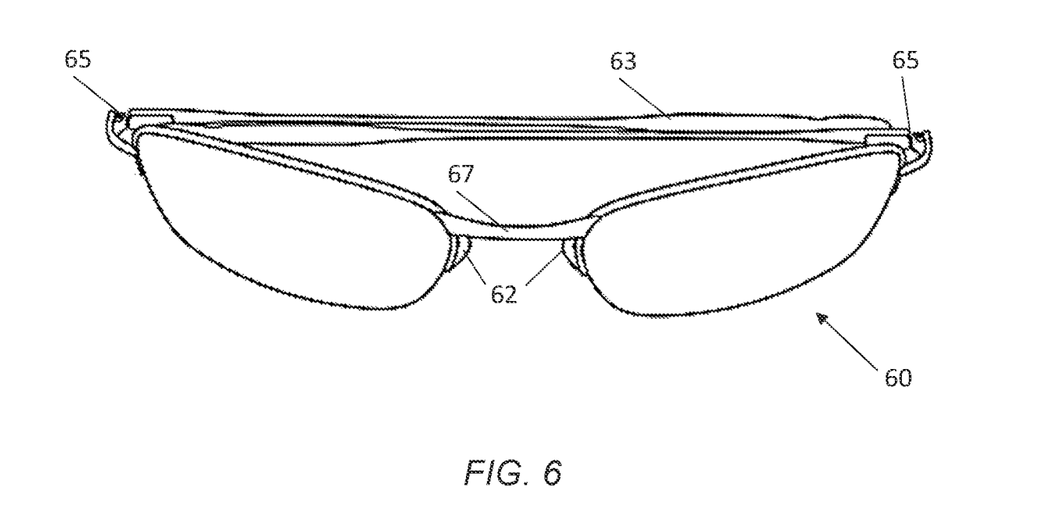

FIG. 6 is an illustration of an eyewear device, indicated generally by the reference numeral 60, in accordance with an example embodiment. The eyewear device 60 is shown in a folded position, comprising arms 63 (e.g. similar to arms 13, 23, 33), hinges 65 (e.g. similar to hinges 15, 25, 35), elements 62 (e.g. similar to elements 12, 22, 32), and frame 67 (similar to frames 27, 37). For example, the eyewear device 60 may be in a folded position when the arms 63 are folded (e.g. substantially parallel) with respect to the frame 67. In contrast, for example, the eyewear devices 20, 30, 40, and 50, are shown in an unfolded position, where the arms 23 or 33 are unfolded (e.g. substantially perpendicular) with respect to the frame 27 or 37.

Figure 7:
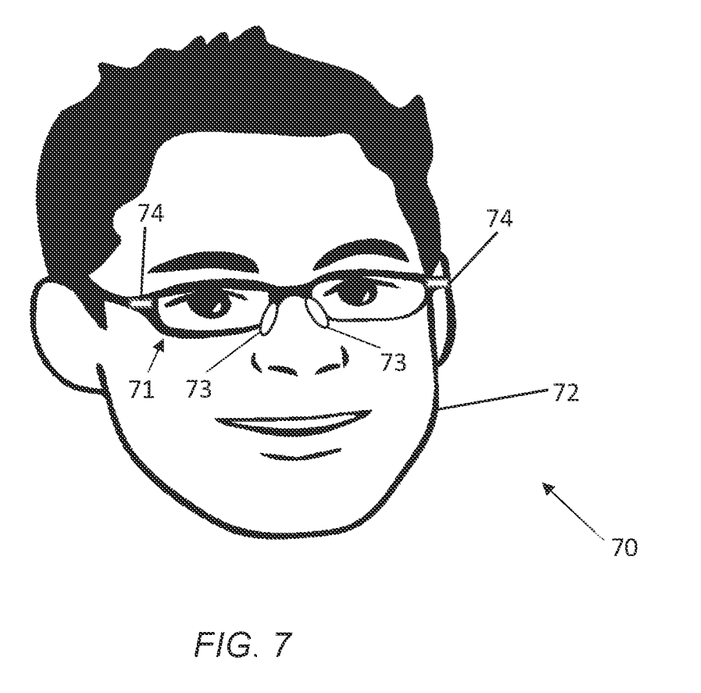
FIG. 7 is an illustration of an eyewear device in use in accordance with an example embodiment.

FIG. 7 is an illustration of an eyewear device in use, indicated generally by the reference numeral 70, in accordance with an example embodiment. The illustration 70 shows an eyewear device 71 (similar to one or more of eyewear devices 10, 20, 30, 40, 50, and 60) in use, for example, by being worn by a user or wearer 72. The eyewear device 71 comprises elements 73 (similar to elements 12, 22, 32, 62) and hinges 74 (similar to hinges 15, 25, 35, 65).

As shown in the illustration 70, when the eyewear device 71 is in use, the elements 73 are configured to be in physical contact with at least one body part of a user or wearer 72 of the eyewear device 71. The at least one body part of the user or wearer 72 comprises the nasal area of the user or wearer. For example, it can be seen in illustration 70 that the eyewear device 71 rests on the nose of the user or wearer 72, such that the elements 73 are in physical contact with the nasal area or the user or wearer 72. When the eyewear device 71 is in use, the hinges 74 are in an unfolded position (e.g. substantially perpendicular with respect to a frame of the eyewear device 71).

Figure 8:
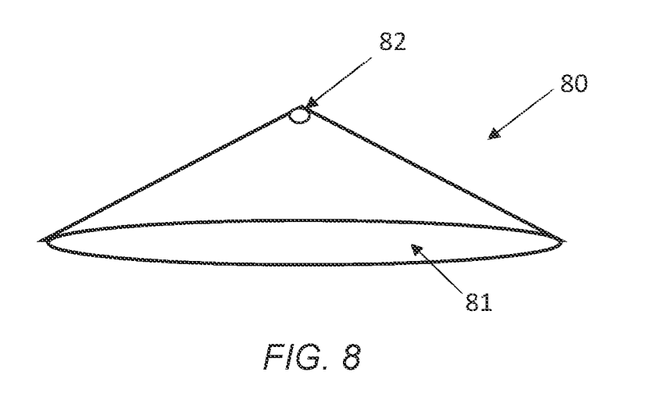
FIG. 8 is an illustration of an element of an eyewear device in accordance with an example embodiment.

FIG. 8 is an illustration of an element, indicated generally by the reference numeral 80 of an eyewear device in accordance with an example embodiment. The element 80 may be conical in shape. One or more of the elements 12, 22, 32, 62, and 73 described above may be similar to element 80, thus having a conical shape.

The element 80 may comprise an elastomer material, such as one or more of soft silicone, polyurethane, or the like.

In one example, the element 80 comprises a first opening 81 and a second opening 82. The first opening 81 may be a relatively large opening (e.g. compared to the second opening 82), for example at a base of the conical shape, and may be oriented on an eyewear device to be in physical contact with at least one body part (e.g. nasal area) of a user or wearer when the eyewear device is in use. The second opening 82 may be a relatively small opening (e.g. compared to the first opening 81), for example at a tip of the conical shape, and may be oriented on an eyewear device to be in physical contact with the frame of the eyewear device. For example, the second opening 82 may be oriented on the frame of the eyewear device to be placed towards a microphone (e.g. microphone 11, 21, 31) or towards a channel (e.g. channel 24, 44) that allows pressure waves from the element 80 to travel to a microphone.

For example, the element 80 may have functionality of being in contact with the user skin at the first opening 81, such that the element 80 is able to generate pressure waves based on internal body sounds (e.g. eyeball friction sounds, speech sounds from the larynx of the user or wearer, or any other physiological internal sounds coming from the user body).

Figure 9:
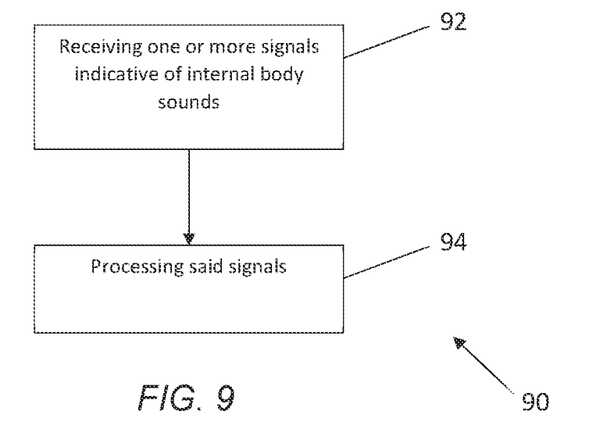
FIGS. 9 and 10 are flowcharts of algorithms in accordance with example embodiments.

FIG. 9 is a flowchart of an algorithm, indicated generally by the reference numeral go, in accordance with an example embodiment. In one example, the algorithm 90 may be performed at an electronic module (e.g. processor), for example, provided in or connected to electronic circuitry (26, 36, 46, 56) of an eyewear device (10, 20, 30, 40, 50, 60, 71).

The algorithm 90 starts with operation 92, where one or more signals indicative of internal body sounds are received from one or more microphones, such as microphones 11, 21, and/or 31. The one or more microphones are configured to detect pressure waves transmitted by the one or more elements (12, 22, 32, 62, 73) and the microphones may in turn generate electronic signals based on the detected pressure waves. The generated electronic signals are then sent to the electronic module, such as a processor (e.g. comprised within or connected to electronic circuitry within the eyewear device).

Next, at operation 94, the received signals are processed. Processing of the signals are described in further detail below with reference to FIG. 10.

Figure 10:
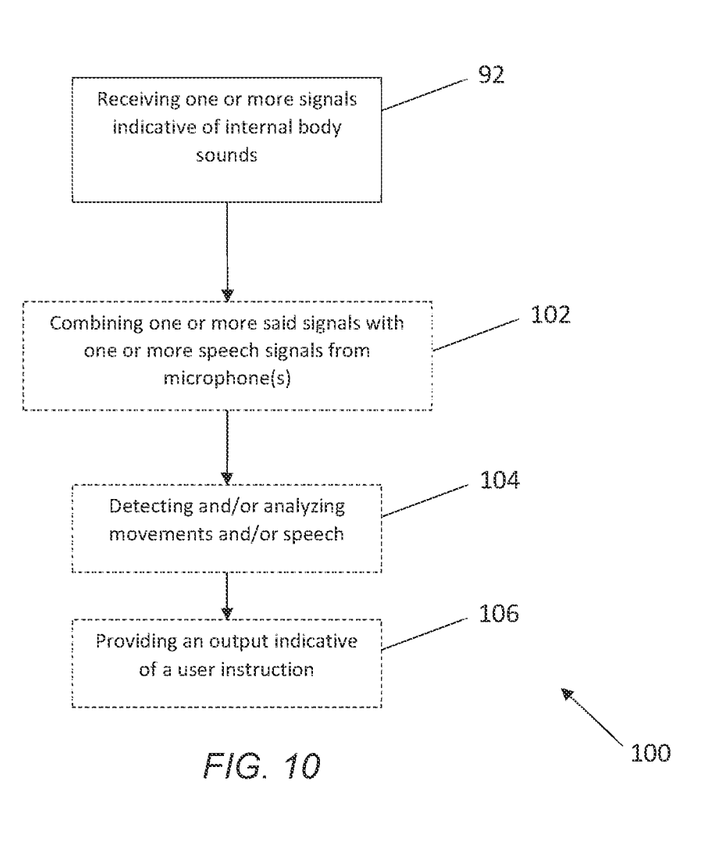

FIG. 10 is a flowchart of an algorithm, indicated generally by the reference numeral 100, in accordance with an example embodiment. In one example, the algorithm 100 may be performed at an electronic module (e.g. processor), for example, provided in or connected to electronic circuitry (26, 36, 46, 56) of an eyewear device (10, 20, 30, 40, 50, 60, 71).

The algorithm 100 starts with operation 92 (as discussed above with reference to FIG. 9), where one or more signals indicative of internal body sounds are received from one or more microphones, such as microphones 11, 21, and/or 31.

Next, algorithm 100 may proceed to one or more of operations 102, 104, and 106, which are optional operations. The operations 102, 104, and 106 may be example implementations of the step 94 for processing the received signals.

At operation 102, one or more of the received signals may be combined with one or more speech signals from said microphones. For example, the microphones of an eyewear device may be configured to detect pressure waves, indicative of internal body sounds, generated from the elements (12, 22, 32, 62, 73, e.g. pads or membranes) provided in the frame of the eyewear device. The same or different microphones of the eyewear device may further be configured to detect speech or other sounds received through the external environment (e.g. speech signals from the user or wearer received through air (not through the frame of the eyewear device)). Therefore, microphones may generate signals (received at operation 92) relating to internal body sounds, and may further generate speech signals. Said signals and speech signals can be combined, for example, in order to detect speech of the user or wearer. For example, by combining signals indicative of internal body sounds and speech signals, signal noise ratio (SNR) of the detected speech may be improved, and therefore speech detection is improved.

At operation 104, the received signals of operation 92 may be processed by detecting and/or analysing movements and/or speech of the user or wearer. For example, the received signals are indicative of internal body sounds, such as eyeball movements, eye winking, speech, whispered speech, respiration, heartbeat, chewing movements, sneezes, and or coughs. These internal body sounds may be detected by analysing the received signals, for example, based on a model, or machine learning algorithms.

At operation 100, the received signals may be processed by providing an output indicative of a user instruction. For example, certain movements or internal body sounds or gestures can be predefined for indicating a user instruction for control of a user interface. The user interface may be of a user device, such as the eyewear device itself (10, 20, 30, 40, 50, 60, 71), a mobile phone or any other user device, which may be connected and/or paired with the eyewear device.

For example, the internal body sounds detected from the signals may comprise an eye wink. As the eyewear device may comprise microphones on both sides, it can be detected whether the signals are indicative of a left eye wink or a right eye wink (based on whether pressure waves were generated at a left element (22, 32, 62, 73) or a right element (22, 32, 62, 73)). For example, a left eyewink may be a predefined user interaction for moving content of a screen (e.g. on a user device) towards the left direction, and a right eye wink may be a predefined user interaction for moving content of a screen towards the right direction. Therefore, when the signals indicate that the user or wearer winked their left eye, an output is provided at operation 106 to be indicative of the user instruction to move the content of a screen towards the left direction. Alternatively, when the signals indicate that the user or wearer winked their right eye, an output is provided at operation 106 to be indicative of the user instruction to move the content of a screen towards the right direction. In one example, simultaneous winking or blinking of both the left and right eye may be a predefined user interaction for selecting a content of a screen or executing a function on the user device. When the signals indicate that the user or wearer winked or blinked both their left and right eyes, an output is provided at operation 106 to be indicative of the user instruction to select a content or execute a function on the user device.

In one example, one or more of eye winking, eye blinking, eye rolling, speech, or the like may be used in combination as a predefined user interaction for executing a predefined user instruction. As such, if any such a combination is detected from the signals, an output indicative of the said predefined user instruction may be generated.

It will be appreciated that the above gestures or interactions are provided as examples only, and there may be many other types of patterns (e.g. speech, sound, facial, or other patterns) or combinations of patterns that may be used for providing an output indicative of a user instruction.

It should be appreciated that the eyewear device may be of any other shape or form, and that the illustrations of FIGS. 2 to 7, are examples only.

Figure 11:
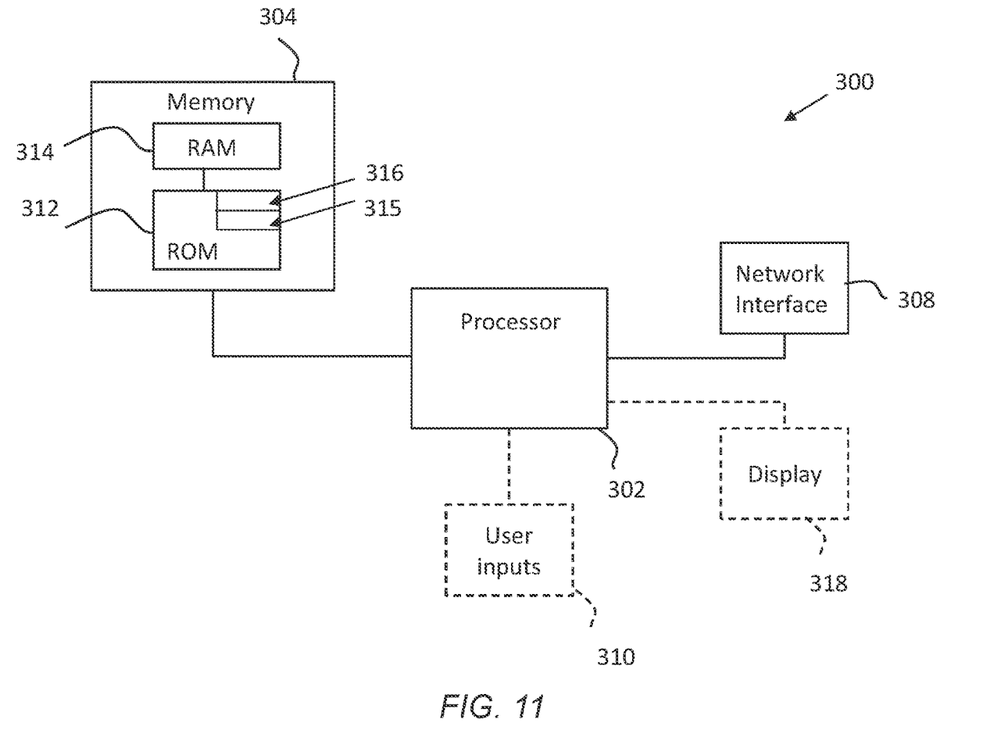
FIG. 11 is a block diagram of components of a system in accordance with an example embodiment.

For completeness, FIG. 11 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid-state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain computer program code which, when executed by the processor implements aspects of the algorithms 90 and 100 described above. Note that in the case of small device/apparatus the memory can be most suitable for small size usage i.e. not always hard disk drive (HDD) or solid-state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 12:
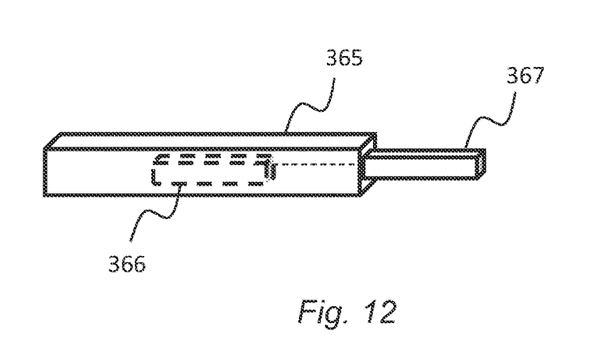
FIG. 12 shows an example of tangible media for storing computer-readable code which when run by a computer may perform methods according to example embodiments described above.

FIG. 12 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow charts of FIGS. 9 and 10 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present wo application or of any application derived therefrom, new claims may be formulated to cover any such features and/or combination of such features.

The invention claimed is:

1. An eyewear device comprising:
a frame comprising one or more elements configured, in use, to be in physical contact with at least one body part of a user or wearer of the eyewear device;
one or more arms;
one or more microphones, wherein the one or more microphones are configured to detect pressure waves generated at the one or more elements; and
at least one channel, wherein a respective one of the at least one channel is provided between a respective one of the one or more microphones and a respective one of the one or more elements, wherein the at least one channel comprises air and is an air-tight channel, and wherein the respective channel is configured to transfer respective pressure waves from the respective element to the respective microphone.

2. An eyewear device as claimed in claim 1, wherein the at least one channel is provided, at least in part, in one or more of said arms of the eyewear device.

3. An eyewear device as claimed in claim 1, wherein the one or more microphones are provided in at least one of said arms.

4. An eyewear device as claimed in claim 3, wherein the eyewear device comprises one or more hinges configured so that the one or more arms are moveable between a folded position and an unfolded position, wherein the one or more hinges connect channels within the eyewear device.

5. An eyewear device as claimed in claim 4, wherein said connected channels are air-tight when the one or more arms are in the unfolded position.

6. An eyewear device as claimed in claim 1, wherein the one or more microphones are provided at or within the frame.

7. An eyewear device as claimed in claim 6, wherein the eyewear device comprises one or more hinges configured so that the one or more arms are moveable between a folded position and an unfolded position, wherein the one or more hinges comprise one or more electric contacts configured to connect the one or more microphones to one or more electronic modules of the eyewear device respectively.

8. An eyewear device as claimed in claim 1, wherein the one or more elements are conical.

9. An eyewear device as claimed in claim 1, wherein the one or more elements comprise an elastomer material.

10. An eyewear device as claimed claim 1, wherein the at least one body part of the user or wearer of the eyewear device comprises the user's or wearer's nasal area.

11. An eyewear device as claimed in claim 1, wherein the eyewear device is configured to detect internal body sounds comprising at least one of: one or more eyeball movements, eye winking, speech, whispered speech, respiration, heartbeat, chewing movements, sneezes, or coughs.

12. An eyewear device as claimed in claim 1 further comprising:
at least one processor; and
at least one memory storing instructions that, when executed by the at least one processor, cause the eyewear device to:
receive one or more signals indicative of internal body sounds from the one or more microphones, wherein the one or more microphones are configured to detect pressure waves transmitted by the one or more elements; and
process said signals.

13. An eyewear device as claimed in claim 12, wherein processing said signals comprises combining the one or more signals with one or more speech signals from the one or more microphones to detect speech of the user or wearer.

14. A method comprising:
receiving, at an eyewear device as claimed in claim 1, one or more signals indicative of internal body sounds from the one or more microphones, wherein the one or more microphones are configured to detect pressure waves transmitted by the one or more elements; and
processing, at said eyewear device, said signals.

15. A method as claimed in claim 14, wherein processing said signals comprises detecting or analyzing movements or speech of the user or wearer.

16. A method as claimed in claim 14, wherein processing said signals comprises combining the one or more signals with one or more speech signals from the one or more microphones to detect speech of the user or wearer.

17. A method as claimed in claim 14, wherein processing said signals comprises providing an output indicative of a user instruction for a user interface.

18. A non-transitory computer readable medium comprising program instructions stored thereon for causing a processor of an eyewear device as claimed in claim 1 to perform at least the following:
receiving one or more signals indicative of internal body sounds from the one or more microphones, wherein the one or more microphones are configured to detect pressure waves transmitted by the one or more elements; and
processing said signals.

* * * * *